United States Patent [19]

Mannschke

[11] Patent Number: 4,813,755
[45] Date of Patent: Mar. 21, 1989

[54] OPTICAL FIBER CONNECTION TO AN OPTICAL IC

[75] Inventor: Lothar Mannschke, Eckental-Eckenhaid, Fed. Rep. of Germany

[73] Assignee: U.S. Philips Corp., New York, N.Y.

[21] Appl. No.: 112,868

[22] Filed: Oct. 23, 1987

[30] Foreign Application Priority Data

Oct. 23, 1986 [DE] Fed. Rep. of Germany ....... 3636091

[51] Int. Cl.⁴ .............................................. G02B 6/30
[52] U.S. Cl. ................... 350/96.17; 350/96.15
[58] Field of Search ............. 350/96.15, 96.17, 96.20; 250/227, 552; 357/17, 19, 30, 74, 80

[56] References Cited

U.S. PATENT DOCUMENTS

| | | | |
|---|---|---|---|
| 3,912,363 | 10/1975 | Hammer | 350/96.17 |
| 3,923,373 | 12/1975 | Dabby et al. | 350/96.17 X |
| 3,967,877 | 7/1976 | Heidrick et al. | 350/96.17 |
| 4,018,506 | 4/1977 | Hammer | 350/96.17 |
| 4,094,579 | 6/1978 | McMahon et al. | 350/96.17 |
| 4,536,058 | 8/1985 | Shaw et al. | 350/96.15 X |

*Primary Examiner*—John D. Lee
*Assistant Examiner*—Phan T. Heartney
*Attorney, Agent, or Firm*—Ernestine C. Bartlett

[57] ABSTRACT

To avoid production-technical and optical problems when connecting optical waveguides to conductor paths leading to the edge of the IC, the connection point is removed from the edge into the lateral face of the optical IC. In that region an optical conductor which extends in the interior of the IC and is connected to the waveguide embedded in the surface by overcoupling, is fed out from the IC.

7 Claims, 1 Drawing Sheet

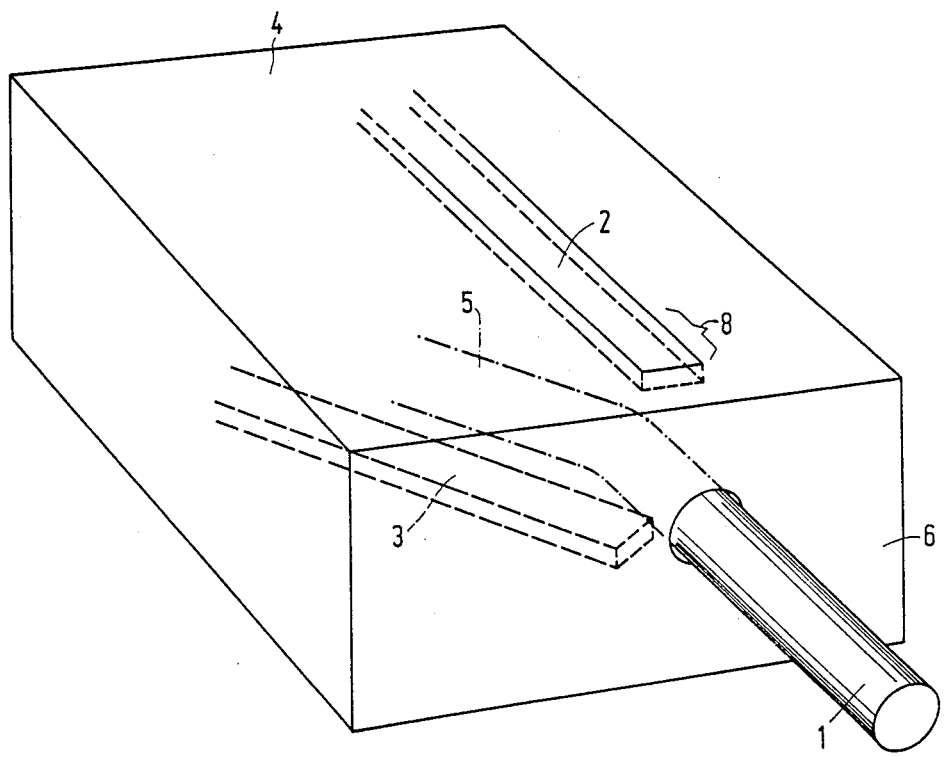

OPTICAL FIBER CONNECTION TO AN OPTICAL IC

FIELD OF THE INVENTION

The invention relates to an arrangement for optically connecting an optical fibre to a planar waveguide embedded in the surface of an optical IC. Arrangements of this type are required for integrated optical sensor systems and integrated optical components used in the optical message transmission technique.

BACKGROUND OF THE INVENTION

Systems used in the optical message transmission technique are accommodated to an ever increasing extent on integrated optical components (Such integrated optical components or optical ICs are disclosed, for example, in DE-OS No. 32 30 657 and U.S. Pat. No. 4,535,440). The light to be transported and to be processed in such systems is fed into planar waveguies which are provided in the surfaces of a glass body by, for example, ion exchange. When the ends of the planar waveguides are led to the side edges of the optical ICs production-technical and optical problems for coupling optical fibres thereto occur.

SUMMARY OF THE INVENTION

The invention has for its object to provide a simple arrangement having an optically lowest possible power loss for the optical connection of optical fibres to planar waveguides, which can be manufactured reliably and accurately also in efficient mass production.

For an arrangement for optically connecting an optical fiber to a planar waveguide embedded in the surface of an optical integrated component this object is accomplished in that (a) the optical fibre is butt-joined to a first planar waveguide which is arranged below the surface of the optical IC; (b) this first planar waveguide extends in at least one region parallel to a second planar waveguide which is embedded in the surface of the optical IC; and (c) the first planar waveguide and the second planar waveguide embedded in the surface are interspaced by a distance at which optical overcoupling between the two planar waveguides occurs.

The invention is based on the recognitions about overcoupling published in the article in "Elektrisches Nachrichtenwesen", Volume 59, No. 4, 1985, pages 380 to 384 and in addition takes into consideration coupling and overcoupling in parts which penetrate into each other or contact each other (ECIO-85, Post deadline paper P3, Berlin 6.-8./5.85, "Transfer Characteristics Calculations of a Planar IO three-port Coupler"). The production of planar waveguides arrranged below the surface is described in, for example, Applied Optics 1, June 1984, Vol. 23, No. 11, pages 1745 to 1748.

By means of a method of ion exchange, cesium ions are, for example, fed in a first production step in an electric-field-assisted manner into a restricted area of the surface of an appropriate substrate. This provides a planar waveguide embedded in the substrate surface. In a further step, appropriate ions, for example sodium ions, are applied in an electric-field assisted manner to the surfaces of the planar waveguide, which causes the cesium-ion planar waveguide to migrate into the substrate thus producing a planar waveguide located in the interior of the substrate. In a third step, in the manner described in the opening paragraph, a planar waveguide is produced on the surface of the substrate. The measures according to the invention provide an outlet for the planar waveguide, which is removed from the edge and is located in the lateral face of the optical IC to which the optical waveguides of the transmission path can be coupled by means of a simpler method.

BRIEF DESCRIPTION OF THE DRAWING

The sole FIGURE is a perspective view of an integrated optical component of the invention.

DETAILED DESCRIPTION OF PREFRRED EMBODIMENTS

The invention will now be described in greater detail and illustrated by means of advantageous embodiments thereof.

As described hereinabove, the invention relates to an arrangement for optically connecting an optical fibre to a planar waveguide embedded in the surface of an optical integrated component wherein (a) the optical fiber is butt-joined to a first planar waveguide which is arranged below the surface of the optical IC; (b) the first planar waveguide extends in at least one region parallel to a second planar waveguide which is embedded in the surface of the optical IC; and (c) the first planar waveguide and the second planar waveguide embedded in the surface are interspaced by a distance at which optical overcoupling between the two planar waveguides occurs.

In especially preferred embodiments, the two waveguides contact each other or partly penetrate each other. In other especially preferred embodiments, the first planar waveguide is fed out from an edge of the optical IC where fiber connecting means are provided and/or the first waveguide extends in parallel with further waveguides in several locations and/or at different levels and/or on facing surfaces of the optical IC.

Thus, according to a preferred embodiment of the invention, to avoid production-technical and optical problems when connecting optical waveguides to conductor paths leading to the edge of the IC, the connection point is removed from the edge into the lateral face of the optical IC. In that region, an optical conductor which extends in the interior of the IC and is connected to the waveguide embedded in the surface by overcoupling, is fed out from the IC.

Referring now to the drawing, an optical fibre 1 is to be coupled to the planar waveguides 2 and 3 of an optical IC 4. The coupling area is enlarged and is shown in the drawing in a cross-sectional, perspective view.

The planar waveguides 2 and 3 are located in the facing surface areas of the optical ICs 4. The first planar waveguide 5, shown by means of a broken line, is arranged parallel to the coupling area of the planar waveguides inside the optical IC4 and is butt-joined to a lateral face 6. The end of this planar waveguide 5 is connected to the optical fibre 1, optionally by means of an adhesive with the aid of a micro-manipulator, not shown. In The region 8 the first planar waveguide 5 and the second planar waveguide 2 run parallel to each other with a predetermined interspacing for such a length that a desired overcoupling is effected.

In a further embodiment, the planar waveguide 5 extends along a path which deviates from the path of the second planar waveguide 2 and runs adjacently to a third, planar waveguide 3. This produces a new overcoupling region of the first planar waveguide 5 to the third planar waveguide 3 in the further extension of its path in the IC.

The invention is implementable to an equal extent for connecting optical fibres to optical ICs having one or a plurality of levels (multilayer).

What is claimed is:

1. An arrangement for optically connecting an optical fibre to a planar waveguide embedded in the surface of an optical IC, wherein the optical fibre is butt-joined to a first planar waveguide which is arranged below the surface of the optical IC, the first planar waveguide extends in at least one region parallel to at least a second planar waveguide embedded in the surface of the optical IC and the first planar waveguide and the second planar waveguide embedded in the surface are interspaced by a distance at which optical overcoupling between the two planar waveguides occurs.

2. An arrangement as claimed in claim 1, wherein the first planar waveguide and the planar waveguide embedded in the surface contact each other.

3. An arrangement as claimed in claim 1, wherein the first planar waveguide and the second planar waveguide embedded in the surface partly penetrate each other.

4. An arrangement as claimed in claim 1, 2 or 3, wherein the first planar waveguide is fed out from an edge of the optical IC, where optical fibre connecting means are provided.

5. An arrangement as claimed in claim 1, wherein the first planar waveguide extends in parallel with further planar waveguides in several locations in surfaces of the optical IC.

6. An arrangement as claimed in claim 5, wherein the further planar waveguides are provided in different levels in surfaces of the optical IC.

7. An arrangement as claimed in claim 5, wherein the first planar waveguide extends parallel to planar waveguides which are arranged on facing surfaces.

* * * * *